(12) United States Patent
Muttik et al.

(10) Patent No.: US 8,171,551 B2
(45) Date of Patent: May 1, 2012

(54) MALWARE DETECTION USING EXTERNAL CALL CHARACTERISTICS

(75) Inventors: Igor Garrievich Muttik, Berkhamsted (GB); Ivan Alexandrovich Teblyashkin, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1913 days.

(21) Appl. No.: 10/403,013

(22) Filed: Apr. 1, 2003

(65) Prior Publication Data
US 2004/0199827 A1    Oct. 7, 2004

(51) Int. Cl.
*G06F 11/00* (2006.01)
*G06F 11/30* (2006.01)

(52) U.S. Cl. .......... 726/24; 726/22; 726/23; 726/25; 713/188

(58) Field of Classification Search .......... 726/24, 726/26, 22, 23, 25; 713/188
See application file for complete search history.

(56) References Cited

U.S. PATENT DOCUMENTS

| | | | | |
|---|---|---|---|---|
| 5,802,277 A * | 9/1998 | Cowland | .......... | 726/22 |
| 6,029,256 A * | 2/2000 | Kouznetsov | .......... | 714/38.1 |
| 6,192,512 B1 * | 2/2001 | Chess | .......... | 717/127 |
| 6,873,960 B1 * | 3/2005 | Wood et al. | .......... | 705/4 |
| 6,956,928 B2 * | 10/2005 | He et al. | .......... | 378/87 |
| 6,971,019 B1 * | 11/2005 | Nachenberg | .......... | 713/188 |
| 6,973,577 B1 * | 12/2005 | Kouznetsov | .......... | 726/25 |
| 7,017,187 B1 * | 3/2006 | Marshall et al. | .......... | 726/24 |
| 7,093,239 B1 * | 8/2006 | van der Made | .......... | 717/135 |
| 7,099,916 B1 * | 8/2006 | Hericourt et al. | .......... | 709/203 |
| 7,269,851 B2 * | 9/2007 | Ackroyd | .......... | 726/24 |
| 7,367,056 B1 * | 4/2008 | Szor et al. | .......... | 726/24 |
| 7,793,346 B1 * | 9/2010 | Daub | .......... | 726/22 |
| 2002/0129277 A1 * | 9/2002 | Caccavale | .......... | 713/201 |
| 2002/0178375 A1 * | 11/2002 | Whittaker et al. | .......... | 713/200 |
| 2003/0101381 A1 * | 5/2003 | Mateev et al. | .......... | 714/38 |
| 2003/0135791 A1 * | 7/2003 | Natvig | .......... | 714/38 |
| 2003/0159070 A1 * | 8/2003 | Mayer et al. | .......... | 713/201 |
| 2003/0229801 A1 * | 12/2003 | Kouznetsov et al. | .......... | 713/200 |
| 2004/0015712 A1 * | 1/2004 | Szor | .......... | 713/200 |
| 2004/0025042 A1 * | 2/2004 | Kouznetsov et al. | .......... | 713/200 |

FOREIGN PATENT DOCUMENTS
WO    WO 9845778 A2 * 10/1998
* cited by examiner

*Primary Examiner* — Mohammad Reza
(74) *Attorney, Agent, or Firm* — Patent Capital Group

(57) ABSTRACT

A malware scanner 2, for malware such as computer viruses, worms, Trojans and the like, utilizes the external call characteristics associated with known items of malware to identify the presence of malware within a computer file. Malware written in a high level language when compiled can take a variety of different forms as object code, but these different object code forms will usually share external call characteristics to a sufficient degree to allow the presence of such external call characteristics to properly and accurately generically identify different compiled variants of the source code malware.

21 Claims, 5 Drawing Sheets

Malware external call characteristics $A \begin{cases} \text{Type API}_{A1}, \text{location}_{A1}, \text{parameter}_{A1}, \text{paraloc}_{A1}; \\ \text{Type API}_{A2}, \text{location}_{A2}; \text{ and} \\ \text{Type API}_{A3}, \text{location}_{A3}, \text{parameter}_{A3}. \end{cases}$ $B \begin{cases} \text{Type API}_{B1}, \text{location}_{B1}; \\ \text{Type API}_{B2}, \text{location}_{B2}; \\ \text{Type API}_{B3}, \text{location}_{B3}; \\ \text{Type API}_{B4}; \\ \text{Parameters}_{B5}, \text{paraloc}_{B5}. \end{cases}$

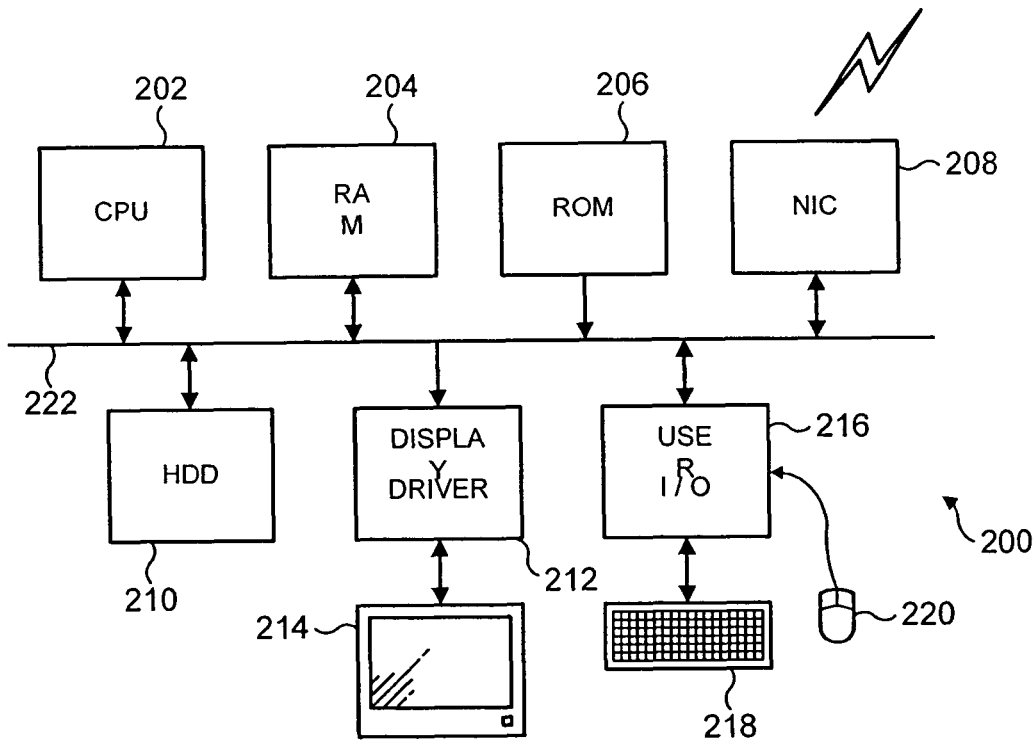

FIG. 7

MALWARE DETECTION USING EXTERNAL CALL CHARACTERISTICS

BACKGROUND OF THE INVENTION

1. Field of the Invention

This invention relates to the field of data processing systems. More particularly, this invention relates to the detection of malware, such as, for example, computer viruses, worms, Trojans and the like, within computer programs.

2. Description of the Prior Art

It is known to provide malware detection systems that examine the code of a computer program to identify characteristics corresponding to known items of malware. These characteristics can be considered to be signatures of the viruses. Common approaches utilise binary search strings to look for these characteristics and checksums to detect the alteration of known computer programs.

The known techniques are not well suited to generically detect programs written in high level languages, such as C or VisualBasic. A problem with programs written in such high level languages is that if they are recompiled with other compilers or compiler options or the source code changed in a relatively minor manner, then the binary search strings needed to detect them are significantly altered. This alterations means that a signature developed to detect a particular variant of an item of malware written in a high level language will often fail to detect a minor variant thereof. As an example, if the source code for a Trojan is available on the Internet, then there often occur many dozens of variants of the Trojan which re-use some or all of the source code that has been made publicly available. Whilst the different items of malware so produced from the same source code have functional similarities, it is difficult with known techniques to develop a signature capable of detecting such variants.

The present invention addresses the problem of generically detecting groups of programs produced from the same source code.

SUMMARY OF THE INVENTION

Viewed from one aspect the present invention provides a computer program product for controlling a computer to detect a computer program containing malware, said computer program product comprising:

search code operable to search said computer program for external call instructions;

comparison code operable to compare said external call instructions within said computer program with at least one predetermined external call instruction characteristic determined from a plurality of external calls and corresponding to known malware; and identification code operable to identify said computer program as containing malware if said external call instructions within said computer program match a predetermined external call instruction characteristic corresponding to known malware.

The present technique recognises that compiled program code reflects the source code from which it was produced in the sense that external calls performed by the program tend to appear in a characteristic order reflecting their appearance in the source code. Even a simple program to read and add the line of text to a file may make the following external calls: read the registry, open a file, read a file, write a file and close a file. Programs with a reasonable level of functionality written in contemporary programming forms, such as in the Win32 environment, typically perform thousands of external calls. The program carries out so many of these external calls that their quantity, order, location, distribution and/or other characteristics are a good way of identifying the programs concerned from their functionality without a requirement to fully emulate their action. Thus, by analysing the external calls present within a computer program a fingerprint for selectively identifying that computer program may be produced and malware written in a high level language can be detected in a variety of different compiled forms by detecting the common characteristics of the external calls made by those different compiled forms.

It will be appreciated that the external calls of which the characteristics are identified can take a variety of different forms. These external calls can be calls to an associated operating system, calls to a dynamic link library associated with the computer program and/or calls to a run-time library joined with the computer program by the compiler.

A characteristic of preferred embodiments is that the searching of the computer program for external calls will search the entire computer program as it may not be possible to determine in advance that the external calls, if present, will occur at some particular location within the computer program.

The predetermined external call instruction characteristics can take a wide variety of different forms. One particularly preferred type of characteristic is the identification of a predetermined set of characterising external calls within a computer program. It will be appreciated that these calls could take place a variety of different sequences, it is the presence of such a collection of calls together, possibly within predetermined relative positions of one another, which is characteristic of the malware to be identified.

The predetermined sets of characterising external calls can include logic within their definition of the characteristics being searched e.g. such a preferred embodiment can incorporate wildcard external call markers whereby any external call occurring at a particular point or within a particular range is considered as matching irrespective of its characteristics.

Further external call characteristics that can be examined are the presence of parameter values associated with external calls, e.g. within a predetermined relative location of particular external calls.

As a preliminary step in the analysis of a computer program which may contain malware, preferred embodiments of the present technique serve to analyse the computer program to determine identifying characteristics of external calls prior to searching the computer program for those external calls. As an example, the link information within an import table or the like is examined and the computer program searched to identify any associated run-time library in order that calls to links identified within the import table or locations within the run-time library are identified as external calls which will be subject to comparison with the predetermined external call characteristics.

It will be appreciated that the present technique could be used to identify a variety of different types of malware, such as, for example, computer viruses, worms and Trojans.

Viewed from another aspect the present invention provides a method of detecting a computer program containing malware, said method comprising the steps of:

searching said computer program for external call instructions;

comparing said external call instructions within said computer program with at least one predetermined external call instruction characteristic determined from a plurality of external calls and corresponding to known malware; and identifying said computer program as containing malware if said external call instructions within said computer program match a predetermined external call instruction characteristic corresponding to known malware.

Viewed from a further aspect the present invention provides apparatus for detecting a computer program containing malware, said apparatus comprising:

search logic operable to search said computer program for external call instructions;

comparison logic operable to compare said external call instructions within said computer program with at least one predetermined external call instruction characteristic determined from a plurality of external calls and corresponding to known malware; and identification logic operable to identify said computer program as containing malware if said external call instructions within said computer program match a predetermined external call instruction characteristic corresponding to known malware.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 schematically illustrates database entries within a database of malware external call characteristics; and FIG. 7 is a diagram schematically illustrating the architecture of a general purpose computer of the type which may be used to implement the above techniques.

DESCRIPTION OF THE PREFERRED EMBODIMENTS

Figure 1:
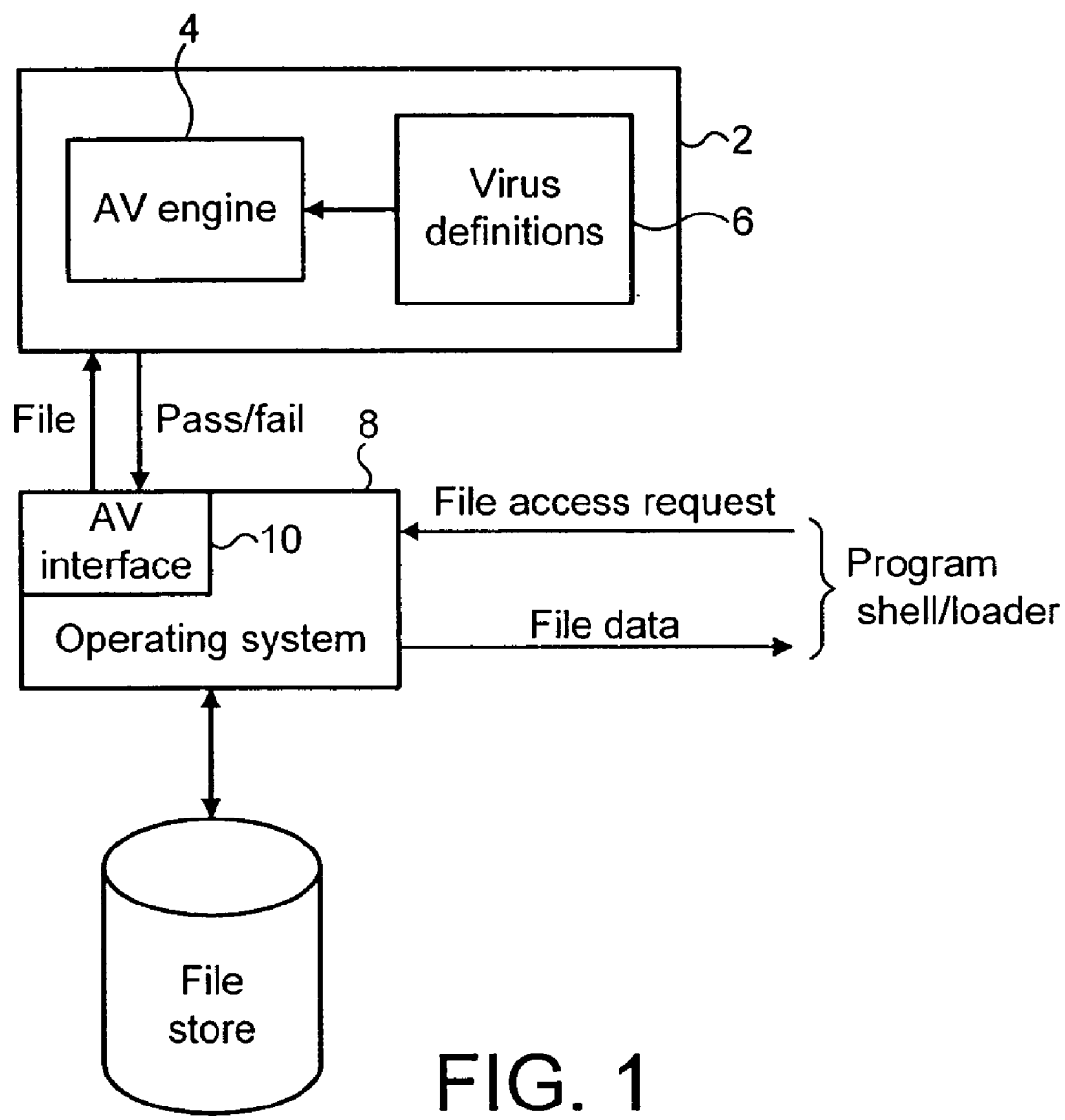
FIG. 1 schematically illustrates a malware scanner.

FIG. 1 illustrates a malware scanner 2 including a scanner engine 4 and a malware definition database 6. File access requests generated by a program shell/loader (such as user inputs trying to start execution of an executable file) are sent to an operating system 8. A malware scanner interface 10 within the operating system 8 intercepts these file access requests and forwards them to the malware scanner 2. The malware scanner 2 uses the scanner engine 4 in conjunction with the malware definition database 6 to scan the file to which an access request has been made to determine whether or not it contains malware. A pass or fail result is passed back to the operating system 8. If the scan is passed, then the requested access to the file is permitted (e.g. the executable file is permitted to run). If a fail result is passed back, then malware found actions are triggered, such as blocking access to the file concerned, deleting the file concerned, quarantining the file concerned, generating alert messages and the like.

Figure 2:
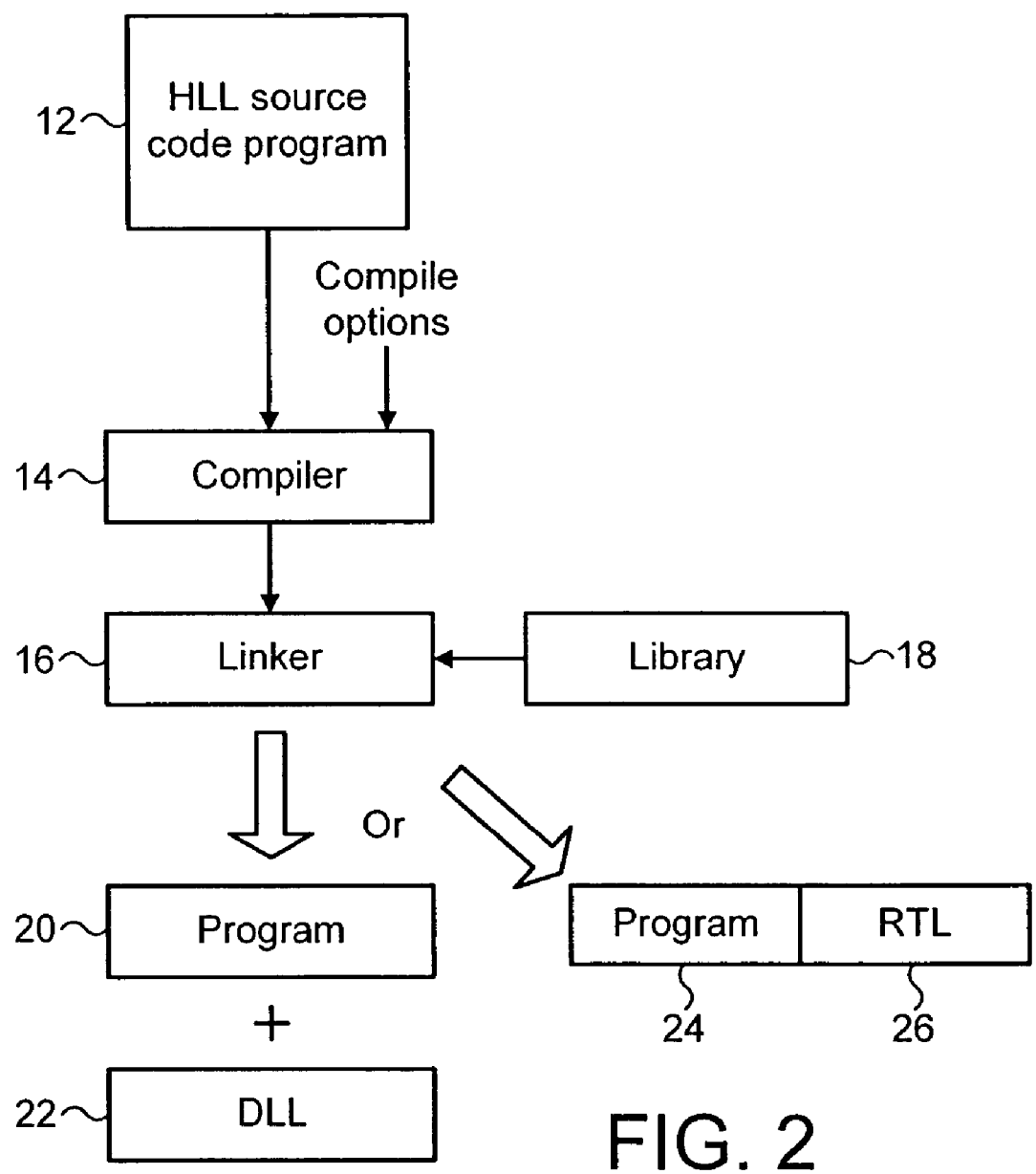
FIG. 2 schematically illustrates the generation of a compiled program from a high level language source code program.

FIG. 2 illustrates the generation of a compiled computer program from a high level language source code program. A computer program writer will typically generate a computer program in a high level language, such as C, VisualBasic or the like. This source code program 12 is then supplied to a compiler 14 which compiles the source code program 12 in accordance with compile options set by the user to generate compiled code. The compiled code is passed to a linker 16 which links calls within the compiled computer program to appropriate routines within a library of routines 18 to generate the compiled and link program. The compiled and linked program may take the form of a compiled program 20 and an associated dynamic link library (DLL) 22 or a compiled program 24 joined to a runtime library (RTL) 26. These different forms may also be combined depending upon the compile options and the environment within which the computer program is to execute. The computer program 20, 24 is the reflection of the source code program 12 with characteristic external calls being made to library functions either within the DLL 22 or the RTL 26. It is the characteristics of these external calls which may be used to generically identify a compiled computer program 22, 24 produced from some common source code.

Figure 3:
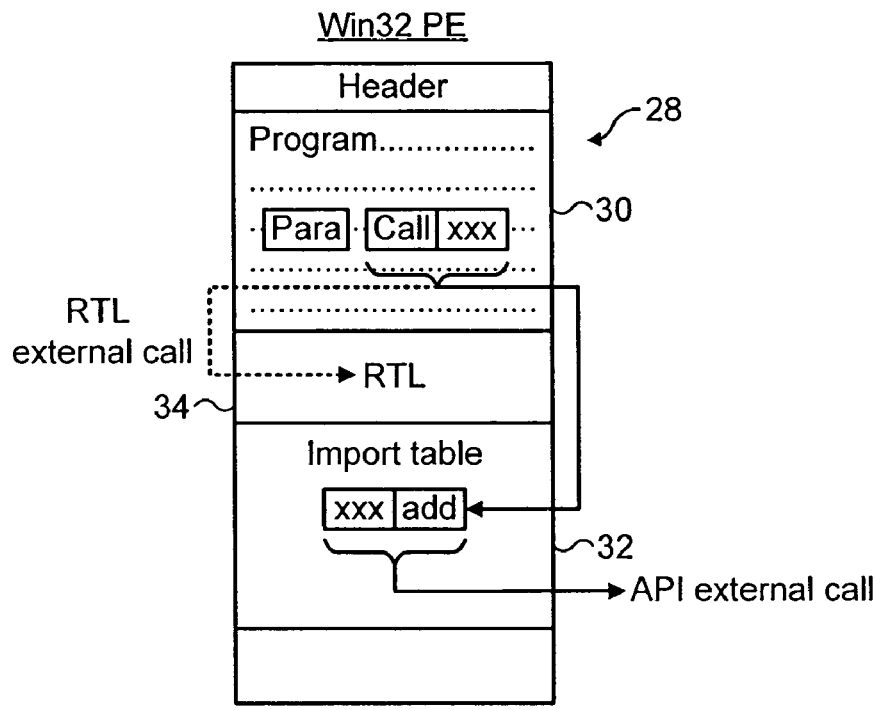
FIG. 3 schematically illustrates one type of compiled computer program including external calls.

FIG. 3 illustrates a Win32 PE file using RTL external calls and API external calls. The WIN32 PE file 28 includes a computer program portion 30 including one or more external calls. These external calls may be via an import table 32 to yield an API external call to an operating system or DLL or alternatively may be to an RTL 34 joined to the computer program 30.

In accordance with the present technique, the import table 32 is examined in combination with the call instructions within the computer program 30 to determine the characteristics of an API external call which can then be matched against a database of external call characteristics known to correspond to malware. The Win32 PE file 28 is also initially examined to identify the boundaries of the RTL 34 (e.g. by utilising similar techniques whereby the characteristic external API calls made by the RTL 34 may be detected and used to identify the start and end of the RTL 34). Other known characteristics of the RTL could also be used to identify its boundaries. Once the boundaries of the RTL 34 are known, a call in the computer program to a location within the RTL 34 will be classified as an RTL external call which can form part of the characteristics of a known item of malware to be detected.

Figure 4:
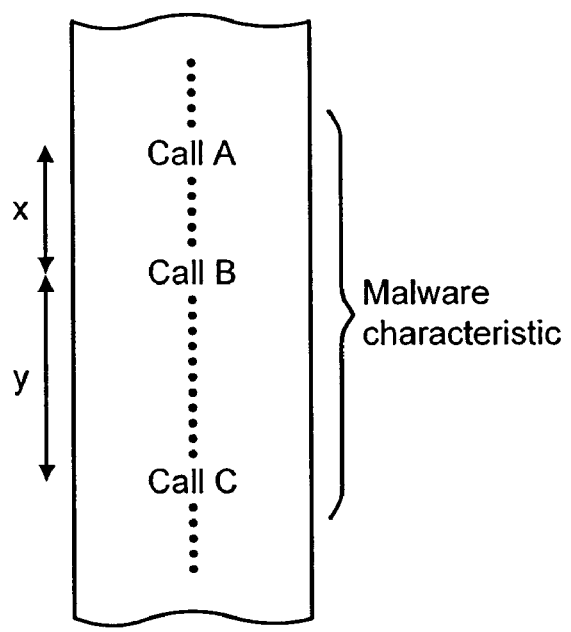
FIG. 4 schematically illustrates a malware characteristic in the form of a set of external calls with given relative positions.

FIG. 4 schematically illustrates a malware characteristic within a computer program comprising a set of three external calls separated by characteristic relative distances. It will be appreciated that in practice a malware characteristic may be formed of a considerably greater number of external calls and that the relationships between the external calls can be expressed in a variety of different ways. A malware characteristic may include logic, such as fuzzy logic, whereby alternatives for different variants may be specified within the malware characteristic and ranges of parameters, parameter locations, call locations and the like may also be specified either separately or in combination.

Figure 5:
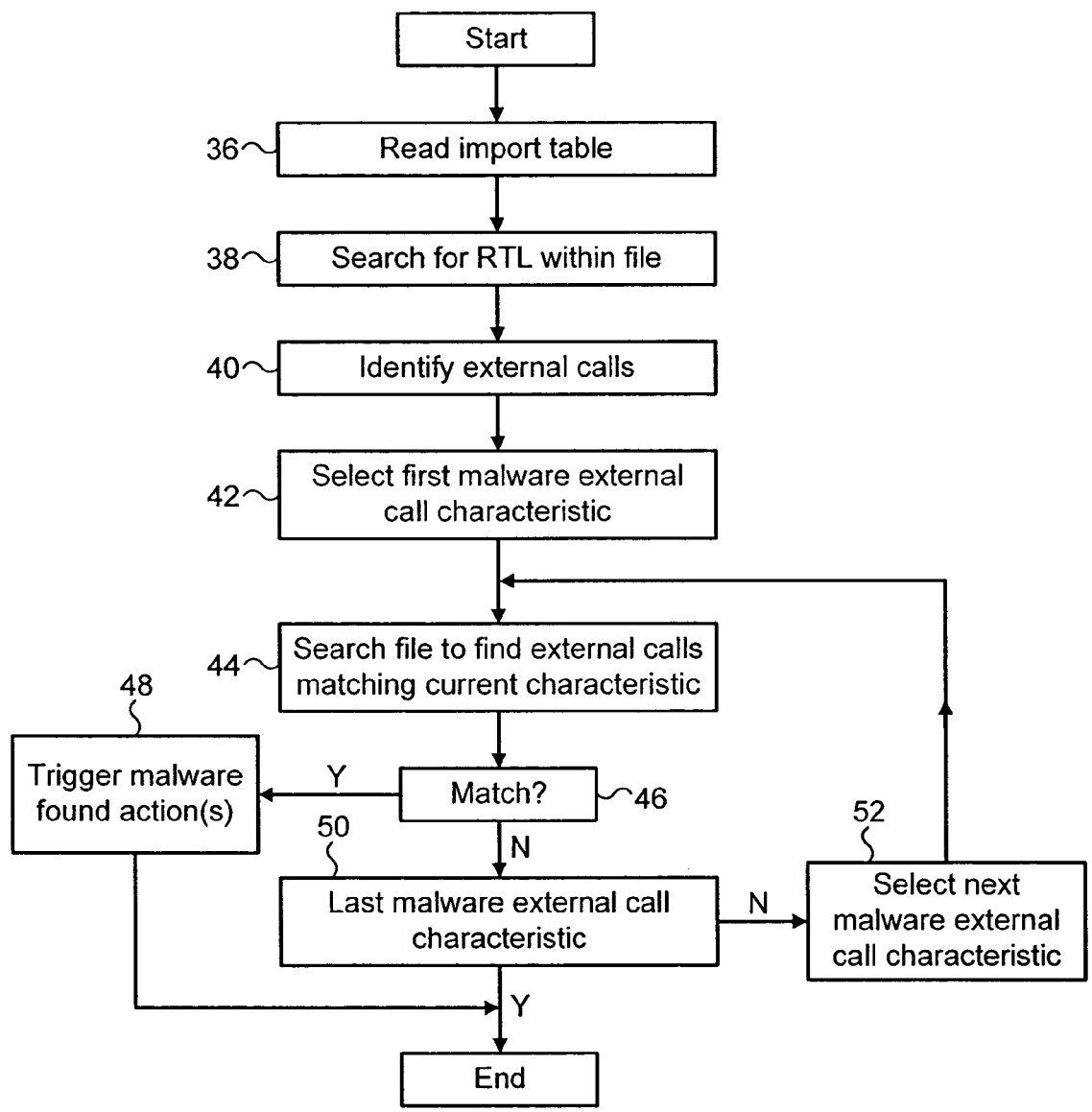
FIG. 5 is a flow diagram schematically illustrating the technique of identifying malware using external call characteristics.

FIG. 5 schematically illustrates a flow diagram of a system utilising the present technique. At step 36 the import table from a computer file to be scanned is read. At step 38 the computer file is searched for any embedded runtime library, possibly using a technique such as looking for characteristic API external calls that are made from within a runtime library. At step 40 the characteristics of calls which are to be classified as external calls are established. At step 42 the first predetermined external call characteristic of a known piece of malware is selected. Step 44 then searches the file to find external calls, a set of external calls, or some other external call characteristic that match the current malware external call characteristic being searched. Usually the entire computer file will need to be searched for external calls in order to be sure that the relevant malware external call characteristics are not within the computer program. However, to increase scanning speed the characteristics may be chosen from only some portion of the file (e.g. the beginning of the code section). At step 46 a test is made as to whether or not a match of the malware external call characteristics has been made. If a match has been made, then step 48 triggers malware found actions such as deleting the file concerned, quarantining the file concerned, denying access to the file concerned, generating alert messages and the like. If a match is not found, then processing proceeds to step 50 at which a determination is made as to whether the final malware external call characteristic within the database of malware external call characteristics has yet been reached. If the final malware external call characteristics has not yet been reached, then processing proceeds to step 52 at which the next malware external call characteristic is selected and processing returned to step 44. If the end of the database has been reached, then processing terminates.

FIG. 6 schematically illustrates two database entries within the malware external call characteristics database that forms part of the malware definition database 6 which is used by the scanner engine 4. In the examples illustrated a type of API call (for example "GetProcAddress" or "RegOpenKeyExA"), its relative location, an associated parameter value (for example 68 02 00 00 80 which is PUSH 80000002) and an associated relative parameter location may be specified as external call characteristic. It will be appreciated that all of these variables are potentially useful in different circumstances and the identification of some external calls will require a particular relative location to other items, or the presence of particular parameters, possibly within a certain range of location. It will also be appreciated that the database entries may include logic, such as fuzzy logic, embodying alternatives, such as AND or OR operations which are conducted between the specified call characteristics. The distances between calls can be measured as a useful identifying characteristic, e.g. in a file on disk or in the memory image of the file.

FIG. 7 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 7 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a non-transitory tangible computer readable medium and configured to:
search code operable to search said computer program for external call instructions;
compare said external call instructions within said computer program with at least one predetermined external call instruction characteristic determined from a plurality of external calls and corresponding to known malware; and
identify said computer program as containing malware if said external call instructions within said computer program match a predetermined external call instruction characteristic corresponding to known malware;
delete one or more files associated with known malware, wherein the one or more predetermined external call instruction characteristics comprise predetermined sets characterizing external calls, and wherein at least one of the predetermined sets characterizing external calls includes at least one wildcard external call marker that provides a match to any external call within a particular range within the computer program, wherein said sets characterizing external calls have associated characterizing relative position information specifying relative position requirements for matching external calls within said computer program.

2. A computer program product as claimed in claim 1, wherein said search code searches for all external calls within said computer program.

3. A computer program product as claimed in claim 1 wherein at least one of said predetermined sets characterizing external calls includes at least one parameterized characterizing external call associated with a characterizing parameter value, said parameterized characterizing external call matching with an external call within said computer program if said characterizing parameter value also matches a corresponding parameter value associated with said external call within said computer program.

4. A computer program product as claimed in claim 3, wherein said characterizing parameter value has associated relative position information specifying a relative position to said parameterized characterizing external call within which a matching parameter value must be found.

5. A computer program product as claimed in claim 1, comprising analysis code operable to analyze said computer program to determine identifying characteristics of external calls prior to said step of searching.

6. A computer program product as claimed in claim 5, wherein said analysis includes one or more of:
analyzing link information associated with said computer program; and
analyzing a location of said computer program within a file to identify a boundary between said computer program and the joined run-time library.

7. A computer program product as claimed in claim 1, wherein said malware is one or more of:
a computer virus;
a worm;
and a Trojan.

8. A method of detecting a computer program containing malware, comprising:
- searching said computer program for external call instructions;
- comparing said external call instructions within said computer program with at least one predetermined external call instruction characteristic determined from a plurality of external calls and corresponding to known malware; and
- identifying said computer program as containing malware if said external call instructions within said computer program match a predetermined external call instruction characteristic corresponding to known malware,
- deleting one or more files associated with known malware, wherein the one or more predetermined external call instruction characteristics comprise
- predetermined sets characterizing external calls, and wherein at least one of the predetermined sets characterizing external calls includes at least one wildcard external call marker that provides a match to any external call within a particular range within the computer program, wherein said sets characterizing external calls have associated characterizing relative position information specifying relative position requirements for matching external calls within said computer program.

9. A method as claimed in claim 8, wherein said step of searching said computer program searches for all external calls within said computer program.

10. A method as claimed in claim 8, wherein at least one of said predetermined sets characterizing external calls includes at least one parameterized characterizing external call associated with a characterizing parameter value, said parameterized characterizing external call matching with an external call within said computer program if said characterizing parameter value also matches a corresponding parameter value associated with said external call within said computer program.

11. A method as claimed in claim 10, wherein said characterizing parameter value has associated relative position information specifying a relative position to said parameterized characterizing external call within which a matching parameter value must be found.

12. A method as claimed in claim 8, comprising analyzing said computer program to determine identifying characteristics of external calls prior to said step of searching.

13. A method as claimed in claim 12, wherein said analyzing includes one or more of:
- analyzing link information associated with said computer program; and
- analyzing a location of said computer program within a file to identify a boundary between said computer program and the joined run-time library.

14. A method as claimed in claim 8, wherein said malware is one or more of:
- a computer virus;
- a worm;
- and a Trojan.

15. An apparatus for detecting a computer program containing malware using a processor and a memory, said apparatus being configured to:
- search said computer program for external call instructions;
- compare said external call instructions within said computer program with at least one predetermined external call instruction characteristic determined from a plurality of external calls and corresponding to known malware; and
- identify said computer program as containing malware if said external call instructions within said computer program match a predetermined external call instruction characteristic corresponding to known malware;
- delete one or more files associated with known malware, wherein the one or more predetermined external call instruction characteristics comprise predetermined sets characterizing external calls, and wherein at least one of the predetermined sets characterizing external calls includes at least one wildcard external call marker that provides a match to any external call within a particular range within the computer program, wherein said sets characterizing external calls have associated characterizing relative position information specifying relative position requirements for matching external calls within said computer program.

16. The apparatus as claimed in claim 15, wherein said search logic searches for all external calls within said computer program.

17. The apparatus as claimed in claim 15, wherein at least one of said predetermined sets characterizing external calls includes at least one parameterized characterizing external call associated with a characterizing parameter value, said parameterized characterizing external call matching with an external call within said computer program if said characterizing parameter value also matches a corresponding parameter value associated with said external call within said computer program.

18. The apparatus as claimed in claim 17, wherein said characterizing parameter value has associated relative position information specifying a relative position to said parameterized characterizing external call within which a matching parameter value must be found.

19. The apparatus as claimed in claim 15, comprising analysis logic operable to analyze said computer program to determine identifying characteristics of external calls prior to said step of searching.

20. The apparatus as claimed in claim 19, wherein said analysis includes one or more of:
- analyzing link information associated with said computer program; and
- analyzing a location of said computer program within a file to identify a boundary between said computer program and the joined run-time library.

21. The apparatus as claimed in claim 15, wherein said malware is one or more of:
- a computer virus;
- a worm; and
- a Trojan.

* * * * *